Patented June 28, 1938

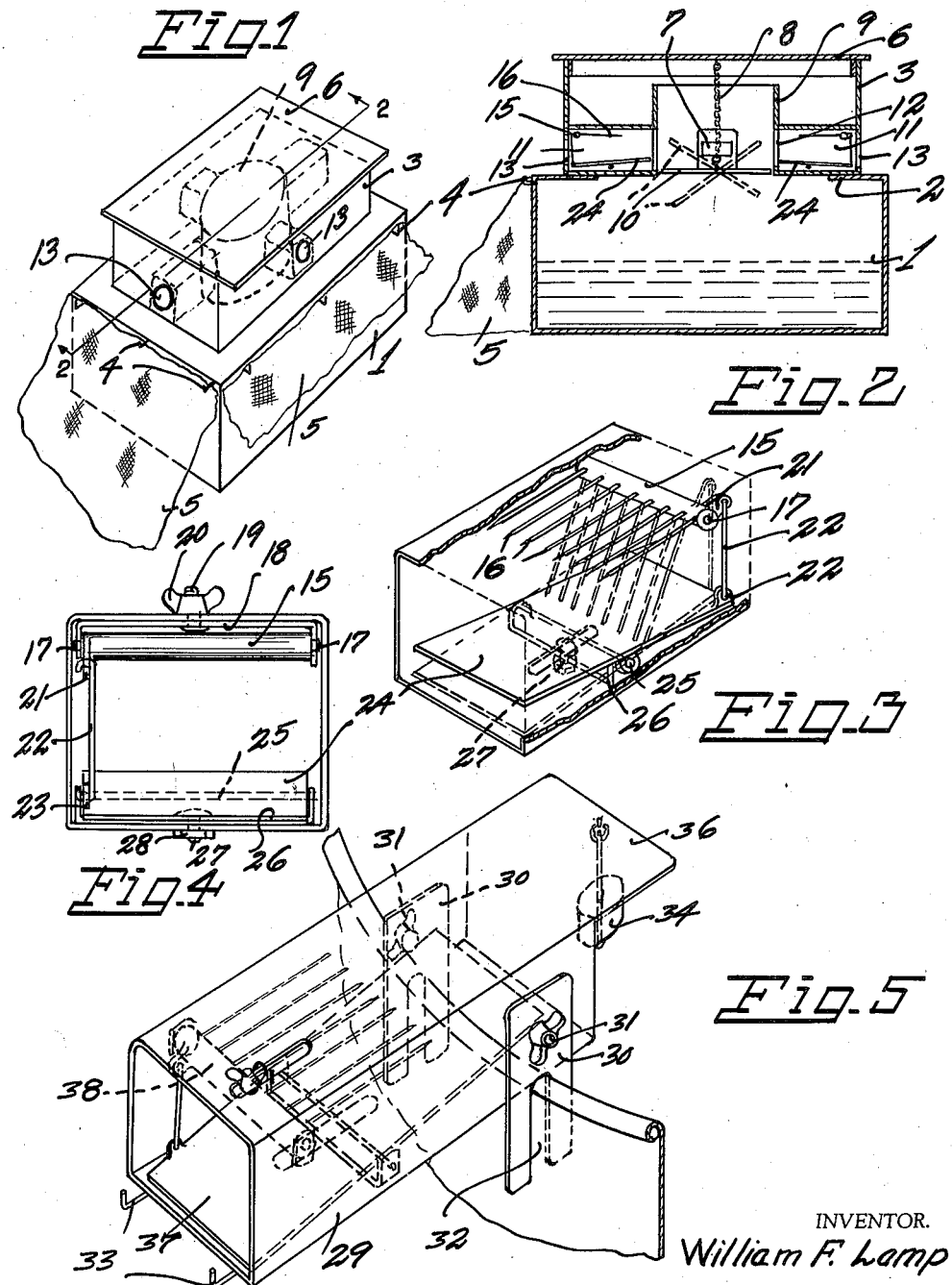

2,122,147

UNITED STATES PATENT OFFICE 2,122,147

TRAP

William Fred Lamp, Spokane, Wash.

Application January 25, 1937, Serial No. 122,152

7 Claims. (Cl. 43—67)

This invention relates to traps and more particularly to a trap for catching mice and other rodents and causing the rodent to be drowned.

One object of the invention is to provide a trap of this character wherein an upper entrapping section or housing is mounted over a water receptacle and is provided with entrances of such construction that while mice may easily enter the housing they will be confined therein and caused to be precipitated down into the water receptacle where they will be drowned.

Another object of the invention is to provide improved means for pivotally mounting tilting platforms in the entrances of the housing and to also provide in each entrance a tiltable guard which is so mounted and so connected with the platform in the entrance that when the platform is tilted by the weight of the animal, the guard will be swung to a position where it will very effectively prevent the animal from backing out through the entrance.

It is another object of the invention to so mount the platform that it may be adjusted to cause it to tilt only after the animal has moved inwardly along the platform a sufficient distance to permit the guard to swing downwardly into position between the animal and the outer end of the entrance.

Another object of the invention is to provide the trap with an improved bait chamber wherein the bait is suspended from the top of the housing in an inner chamber to which the entrances lead, a tiltable bottom being provided for the inner chamber so that when the animal enters this chamber the bottom will be tilted to drop the animal into the water container.

Another object of the invention is the provision of a trap wherein an entrance tunnel having a tiltable platform therein may be mounted upon the wall of a bucket serving as a water container, thus making it unnecessary to provide a special water container.

The invention is illustrated in the accompanying drawing, wherein

Figure 1 is a perspective view of the improved trap.

Figure 2 is a sectional view taken vertically through the trap along the line 2—2 of Figure 1.

Figure 3 is a perspective view showing one of the entrance tunnels upon an enlarged scale with the tunnel partially broken away.

Figure 4 is a view in end elevation looking at the inner end of one of the entrance tunnels.

Figure 5 is a perspective view of a modified form of trap wherein an entrance tunnel is applied to the wall of a bucket serving as a water container.

The water container 1 is formed of metal or any other desired material and has the intermediate portion of its top wall 2 cut out to provide a large opening through which communication is had to the interior of the container. An upper trap section or housing 3 is supported upon the top of the water container 1 and is of such dimensions that when it is placed upon the water container 1, its walls are spaced from margins of the top 2 and the exposed portions of the top form a pathway about the housing along which the mice or other rodents may walk to reach the entrances of the housing. Hooks 4 project from walls of the water container at the top thereof and a suitable number of these hooks are provided at each side of the container to permit cloths 5 to be suspended, as shown in Figures 1 and 2, and serve as runways up which the mice may travel in order to reach the top of the container.

The housing 3 is also formed of metal and has its open upper end closed by a removable lid or cover 6 which is removable from the housing in order that the bait 7 may be attached to the lower end of a chain 8 suspended from the cover at the center thereof. A sleeve 9 which defines an inner compartment is disposed centrally of the housing and is open at its upper and lower ends. This is the compartment from which the animal is dropped into the water container and it is provided with a bottom 10 consisting of a metal disc pivoted across its diameter so that it may be tilted from a horizontal position to an inclined position in either direction, as indicated by dotted lines in Figure 2, and cause the animal which has entered the inner compartment to slide along the tilted bottom and drop into the water container.

In order for the animal to have access to the inner compartment, there have been provided entrance tunnels 11 which extend radially of the sleeve or annular wall 9 between opposed openings 12 and 13 formed in this wall and in the walls of the housing. The tunnels serve not only to permit the animal to pass into the inner chamber but also as supports for the annular wall 9. In view of the fact that the tunnels lead from each of the walls of the housing, an animal may enter the inner chamber from any side of the housing and, in addition, more than one animal may enter at the same time.

It is desired to prevent animals from backing out of the tunnels after entering the same and approaching the inner chamber and, therefore, in each tunnel there has been mounted a guard 15 consisting of a shaft carrying a plurality of rods 16 spaced from each other longitudinally of the shaft and having pointed free ends so that an animal may not force its way under the rods without injury to itself. The shaft extends transversely in the tunnel in which it is mounted adjacent the outer end thereof and at its ends is provided with trunnions 17 rotatably mounted in openings formed in the depending arms of a yoke 18 which also extends transversely in the tunnel and is secured therein by a bolt 19 and a wing nut 20. The bolt extends upwardly through a slot formed in the upper wall of the tunnel longitudinally thereof and by loosening the nut, the yoke may be shifted longitudinally in the tunnel. An arm 21 extends from one end of the shaft of the guard 15 towards the outer end of the tunnel and to this arm is pivoted the upper end of a link 22 having its lower end pivoted to an ear 23 rising from the outer end of a platform 24 at a side thereof. The platform 24 is formed of sheet metal and intermediate its length carries a transversely extending pivot rod 25 having its ends projecting from opposite side edges of the platform and loosely engaged in openings formed in upstanding arms of a yoke 26 which rests upon the bottom of the tunnel transversely thereof and is secured by a bolt 27 which passes downwardly through a slot formed in the bottom of the tunnel longitudinally thereof. By loosening the nut 28 of this bolt, the yoke and the platform may be shifted longitudinally in the tunnel and the platform properly disposed in the tunnel in such a position that its ends will be close to ends of the tunnel and the outer end of the platform normally rest upon the bottom of the tunnel. Adjustment of the platform and the guard will dispose them in their proper positions in the tunnel and also cause the rods 16 of the guard to extend horizontally in a raised position when the outer end of the platform is resting upon the bottom of the tunnel.

When the improved trap is in use, water is poured into the water container until it is of sufficient depth to drown a mouse or other animal intended to be caught. The bait is applied to the lower end of the chain 8 and the cover or lid 6 then applied to the housing. The animal climbs up one of the fabric sheets 5 and upon reaching the top of the water container, moves along the path provided by the projecting portions of the top until it reaches one of the entrance openings 13 formed in the side walls of the housing 3. The animal will now pass through the tunnel leading from the entrance opening to the companion opening 12 of the sleeve or annular wall 9 and in doing so must pass over the pivoted platform 24 in the tunnel. After the animal passes the pivotal mounting of the platform, the inner end portion of the platform will be moved downwardly by the weight of the animal and the outer end portion of the platform will move upwardly. As the outer end portion of the platform moves upwardly, the link 22 causes the shaft of the guard 15 to be rocked and the prongs or rods 16 carried by the shaft will be swung downwardly to the position indicated by dotted lines in Figure 3 where they will be disposed between the animal and the outer end of the tunnel and prevent the animal from backing out of the tunnel. The animal can then only leave the tunnel by way of the inner end thereof and in doing so passes into the inner chamber and onto the platform 10 which will tilt to one of the positions indicated by dotted lines in Figure 2 and cause the animal to drop into the water container where it will drown. As soon as the animal enters the inner chamber, the platform in the tunnel returns to its initial position and the fingers of the guard will swing upwardly to a raised position, thus restoring the trap to its normal condition and allowing another animal to pass into the tunnel. In case the animal attempts to back out of the tunnel as the inner end portion of the platform 24 moves downwardly, the pointed ends of the rods 16 will engage the animal and continued movement of the animal towards the outer end of the tunnel will cause the rods or prongs to dig into the animal's body. Therefore, the animal will move towards the inner end of the tunnel and enter the inner chamber.

In Figure 5 there has been illustrated a modified form of trap. In this embodiment of the invention, the tunnel 29 which is open at both ends carries supporting brackets 30 which are disposed vertically against opposite side walls of the tunnel and are secured by bolts 31. Lower portions of the brackets extend downwardly from the tunnel and are slotted, as shown at 32, in order that the brackets may be disposed in straddling relation to the wall of a bucket and support the tunnel transversely of the bucket with its inner end portion projecting over the bucket. Hooks 33 which correspond to the hooks 4 are provided at the outer end of the tunnel in order that a sheet of fabric may be engaged with these hooks and constitute a gangway up which the animal may climb in order to reach the outer end of the tunnel. Upon reaching the tunnel, the animal sees the bait 34 carried by the hanger 35 which is suspended from the extension 36 of the top wall of the tunnel at the inner end thereof and passes through the tunnel over the platform 37. This platform corresponds to the platform 24 in all respects and has associated with it a guard 38 corresponding to the guard 15 and the platform and its cooperating guard operates as previously set forth to confine an animal in the inner end portion of the tunnel from which it will drop into the bucket and drown.

Having thus described the invention, what is claimed as new is:

1. In a trap, a container having a top wall formed with an opening, a housing resting upon the top wall about the opening and spaced from the margins of the top wall to provide a pathway about the housing, the walls of the housing being formed with entrance openings, a removable cover for said housing, a sleeve in said housing defining an inner chamber and formed with openings opposite the openings of the housing, tunnels connecting opposed openings of the sleeve and housing, tiltable platforms in said tunnels, guards in the tunnels connected with said platforms and adapted to be moved thereby from a raised position to a lowered position across the tunnels when the platforms are tilted out of their normal position by an animal passing over a platform, a tiltable platform pivotally mounted in the inner chamber, and a bait holder suspended from said cover within the inner chamber.

2. In a trap, a container having an opening at its top, a housing carried by said container about the opening, an inner wall in said housing defining an inner chamber, a platform in the inner chamber pivotally carried by the inner wall, the inner wall and the walls of the housing being formed with opposed openings, tunnels connecting opposed openings and serving as means for supporting the inner wall, means for suspending bait in the inner chamber, guards in said tunnels normally out of guarding relation thereto, and animal actuated means in the tunnels for moving the guards to a guarding position across the tunnels.

3. In a trap, a container open at its top, a housing carried by said container about the opening at the top thereof, said housing having an inner chamber spaced from the walls of the housing, tunnels extending from the inner chamber to the walls of the housing and open at their ends, a platform pivotally mounted in the inner chamber, means for suspending bait in the inner chamber, a guard for each tunnel movable into and out of guarding relation thereto, a platform pivotally mounted in each tunnel, and means connecting the guard with said platform for moving the guard to a guarding position when the platform in the tunnel is moved by the weight of an animal.

4. In a trap, a housing, an inner chamber in said housing spaced from the walls of the housing and having entrance openings in opposed relation to openings formed in the walls of the housing, a platform pivotally mounted in the inner chamber, means for holding bait in the inner chamber, tunnels extending between opposed openings of the housing and the inner chamber and secured at their ends to the walls of the housing and the inner chamber and constituting means for supporting the inner chamber, a platform pivotally mounted in each tunnel, a guard in each tunnel, and means connecting the guard and the platform for moving the guard into guarding relation to the tunnel when the platform is moved by the weight of an animal crossing the platform.

5. In a trap, a tunnel open at its ends and having a bottom formed with a longitudinally extending slot, a guard having a shaft extending transversely in the tunnel and rotatably mounted, prongs extending from said shaft longitudinally of the tunnel, an arm extending from one end of said shaft in opposed relation to said prongs, a platform extending longitudinally in said tunnel, a yoke under said platform pivotally supporting the platform and resting upon the bottom of the tunnel, a fastener for said yoke passed through the slot formed longitudinally in the bottom of the tunnel to secure the yoke in an adjusted position, and a link connecting one end of said platform with said arm whereby when the platform is moved by the weight of an animal crossing the platform the shaft will be rotated and the prongs swung into position to extend across the tunnel.

6. In a trap, a tunnel open at its ends, a guard having a shaft extending transversely in the tunnel and rotatably mounted, prongs extending from said shaft longitudinally of the tunnel, an arm extending from one end of said shaft in opposed relation to said prongs, a platform extending longitudinally in said tunnel and pivotally mounted intermediate its length, and a link connecting one end of said platform with said arm whereby when the platform is moved by the weight of an animal crossing the platform the shaft will be rotated and the prongs swung into position to extend across the tunnel in guarding relation thereto, the guard and the platform being shiftable longitudinally of the tunnel to adjusted positions whereby the prongs of the guard will be disposed horizontally in a raised position when the outer end of the platform is resting upon the bottom of the tunnel.

7. In a trap, a tunnel open at its ends, a guard having a shaft extending transversely in the tunnel and rotatably mounted, prongs extending from said shaft longitudinally of the tunnel, an arm extending from one end of said shaft in opposed relation to said prongs, a platform extending longitudinally in said tunnel and pivotally mounted intermediate its length, and a link connecting one end of said platform with said arm whereby when the platform is moved by the weight of an animal crossing the platform the shaft will be rotated and the prongs swung into position to extend across the tunnel, and brackets depending from the tunnel at opposite sides thereof and slotted from their lower ends to straddle a wall of a water container.

WILLIAM FRED LAMP.